US010135884B2

(12) United States Patent
Pilkington

(10) Patent No.: US 10,135,884 B2
(45) Date of Patent: Nov. 20, 2018

(54) ACCESS TO A COMPUTER NETWORK

(71) Applicant: International Business Machines Corporation, Armonk, NY (US)

(72) Inventor: Adam J. Pilkington, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 13/899,059

(22) Filed: May 21, 2013

(65) Prior Publication Data

US 2013/0326078 A1 Dec. 5, 2013

(30) Foreign Application Priority Data

May 22, 2012 (GB) ..................................... 1208985

(51) Int. Cl.
*H04L 29/06* (2006.01)
*H04L 29/08* (2006.01)
*H04W 12/08* (2009.01)
*H04L 12/24* (2006.01)
*H04L 12/28* (2006.01)

(52) U.S. Cl.
CPC ...... *H04L 65/1073* (2013.01); *H04L 41/0893* (2013.01); *H04L 41/5061* (2013.01); *H04L 67/306* (2013.01); *H04W 12/08* (2013.01); *H04L 12/2858* (2013.01); *H04L 63/0807* (2013.01)

(58) Field of Classification Search
CPC . H04W 28/0268; H04W 28/16; H04W 28/24; H04W 52/26; H04W 52/265
See application file for complete search history.

(56) References Cited

U.S. PATENT DOCUMENTS

| 5,455,953 | A | 10/1995 | Russell | |
|---|---|---|---|---|
| 5,815,574 | A | 9/1998 | Fortinsky | |
| 7,174,383 | B1 * | 2/2007 | Biswas et al. | ................ 709/229 |
| 7,328,274 | B2 * | 2/2008 | Zhang | .................... H04L 12/14 370/230 |
| 7,554,987 | B2 * | 6/2009 | Proctor | ................... H04W 4/02 370/252 |

(Continued)

FOREIGN PATENT DOCUMENTS

| EP | 1995927 | 11/2008 |
|---|---|---|
| KR | 10-1043215 | 1/2010 |

OTHER PUBLICATIONS

Pilkington, "Access to a Computer Network," U.S. Appl. No. 14/487,390, filed Sep. 16, 2014, 17 pages.

(Continued)

*Primary Examiner* — Azizul Choudhury
(74) *Attorney, Agent, or Firm* — Yee & Associates, P.C.; Robert Shatto

(57) ABSTRACT

A system for mediating access to a computer network comprises the steps of identifying a user who wishes to access the computer network, obtaining quality of service data specific to the user, generating a token comprising the quality of service data and providing an output derived from the token to the user. Optionally, the system can further comprise receiving a request from the user for access to the computer network and providing access to the computer network to the user according to the token.

14 Claims, 6 Drawing Sheets

(56) References Cited

U.S. PATENT DOCUMENTS

| | | | |
|---|---|---|---|
| 8,379,630 B2* | 2/2013 | Wu .................. H04W 72/1247 370/351 |
| 2001/0052083 A1 | 12/2001 | Willins et al. |
| 2002/0143981 A1* | 10/2002 | DeLima et al. ............. 709/233 |
| 2003/0140230 A1 | 7/2003 | de Jong et al. |
| 2006/0074814 A1 | 4/2006 | Lovell, Jr. |
| 2007/0022048 A1* | 1/2007 | Kingsborough et al. ....... 705/39 |
| 2007/0038525 A1* | 2/2007 | Waldvogel et al. ............ 705/26 |
| 2007/0255793 A1* | 11/2007 | Kwon et al. ................... 709/206 |
| 2008/0089239 A1* | 4/2008 | Todd et al. .................... 370/252 |
| 2008/0183604 A1* | 7/2008 | Chou ............................... 705/30 |
| 2008/0310303 A1* | 12/2008 | Wang .................. H04W 28/24 370/230.1 |
| 2009/0094109 A1 | 4/2009 | Aaronson et al. |
| 2009/0190471 A1* | 7/2009 | Mahendran ......... H04L 12/5695 370/230.1 |
| 2009/0328167 A1 | 12/2009 | O'Mahony |
| 2010/0299266 A1 | 11/2010 | Catania et al. |
| 2011/0055547 A1 | 3/2011 | Lee et al. |
| 2011/0112898 A1 | 5/2011 | White |
| 2011/0239282 A1 | 9/2011 | Svarfvar et al. |
| 2011/0281557 A1 | 11/2011 | Choi et al. |
| 2011/0313826 A1* | 12/2011 | Keen et al. .................. 705/14.4 |
| 2012/0317247 A1* | 12/2012 | Dattagupta et al. .......... 709/220 |
| 2013/0060689 A1* | 3/2013 | Oskolkov et al. ............... 705/42 |

OTHER PUBLICATIONS

Somma et al., "Cohesion Case Study", CIS 500: Information Systems for Decision Making, Dec. 19, 2008, 20 pages.

"Defining Success in Retail: How to use data-on-demand solutions to meet four top challenges", Torex, Copyright 2007, 20 pages.

Thayer, "New ID Scanner Improves Customer Relations Management", The Point of Sale News, Jun. 6, 2011, 2 pages.

"Make a QR Code for Android Phones to Connect to a Secured Wi-Fi", Gadgets Media, Sep. 8, 2011, 5 pages.

Final Office Action, dated Oct. 23, 2015, regarding U.S. Appl. No. 14/487,390, 14 pages.

Office Action, dated Apr. 8, 2015, regarding U.S. Appl. No. 14/487,390, 11 pages.

Office Action, dated May 25, 2016, regarding U.S. Appl. No. 14/487,390, 23 pages.

Final Office Action, dated Dec. 2, 2016, regarding U.S. Appl. No. 14/487,390, 16 pages.

* cited by examiner

ACCESS TO A COMPUTER NETWORK

FIELD OF THE INVENTION

This invention relates to a method of, and system for, mediating access to a computer network.

BACKGROUND

Wireless technologies such as Wi-Fi allow electronic devices to exchange data wirelessly (using radio waves) over a computer network and is commonly used to provide high-speed Internet connections to local devices. Commercial organizations such as retail establishments often offer free Wi-Fi as an incentive for a customer to purchase goods. The central problem is how to only offer that Wi-Fi access to customers and not to anyone who can receive the Wi-Fi signal, for example people who are outside of the retail premises in the street. Existing solutions to this problem include keeping the access details secret until requested or displaying them inside the premises. The first solution has the problem that the access details require changing on a regular basis and staff must be kept informed as to the details of the new credentials. The second solution has the problem that the access details are still visible to non-customers.

BRIEF SUMMARY OF THE INVENTION

According to a first aspect of the present invention, there is provided a method of mediating access to a computer network, the method comprising the steps of identifying a user who wishes to access the computer network, obtaining quality of service data specific to the user, generating a token comprising the quality of service data and providing an output derived from the token to the user.

According to a second aspect of the present invention, there is provided a system for mediating access to a computer network comprising a processor arranged to identify a user who wishes to access the computer network, obtain quality of service data specific to the user, generate a token comprising the quality of service data and create an output derived from the token for the user.

According to a third aspect of the present invention, there is provided a computer program product on a computer readable medium for mediating access to a computer network, the product comprising instructions for identifying a user who wishes to access the computer network, obtaining quality of service data specific to the user, generating a token comprising the quality of service data and providing an output derived from the token to the user.

Owing to the invention, it is possible to provide a method of allowing access to a computer network, such as a Wi-Fi network, that will be secure in only allowing access to those who are approved for access, will not place any additional requirements on employees who may be working in the environment that supports access to the computer network, and will distinguish between users in terms of the quality of service provided to different users in a manner that will enhance the commercial offering of the provider of the computer network.

In a preferred embodiment, the invention combines customer relationship data at a point-of-sale device to provide a unique image for a customer, which contains an embedded Wi-Fi access token. The token can be time limited and contains quality of service (QOS) information that controls how that customer may use the Wi-Fi network. The QOS terms could encompass factors such as allocated bandwidth to their connection and/or the time they are allowed to use the Wi-Fi, for example. One advantage of this is that the image generated would be difficult for someone to access within the required time and would allow a retailer to provide a better customer experience either by rewarding existing loyalty or being able to combine other factors such as increased QOS terms when certain items are purchased. The system will receive a request from the user for access to the computer network and provide access to the computer network to the user according to the token. In the preferred embodiment, the system will check that the request received from the user to access the computer network is derived from the output provided to the user.

BRIEF DESCRIPTION OF THE DRAWINGS

Preferred embodiments of the present invention will now be described, by way of example only, with reference to the following drawings, in which.

DETAILED DESCRIPTION OF THE DRAWINGS

Figure 1:
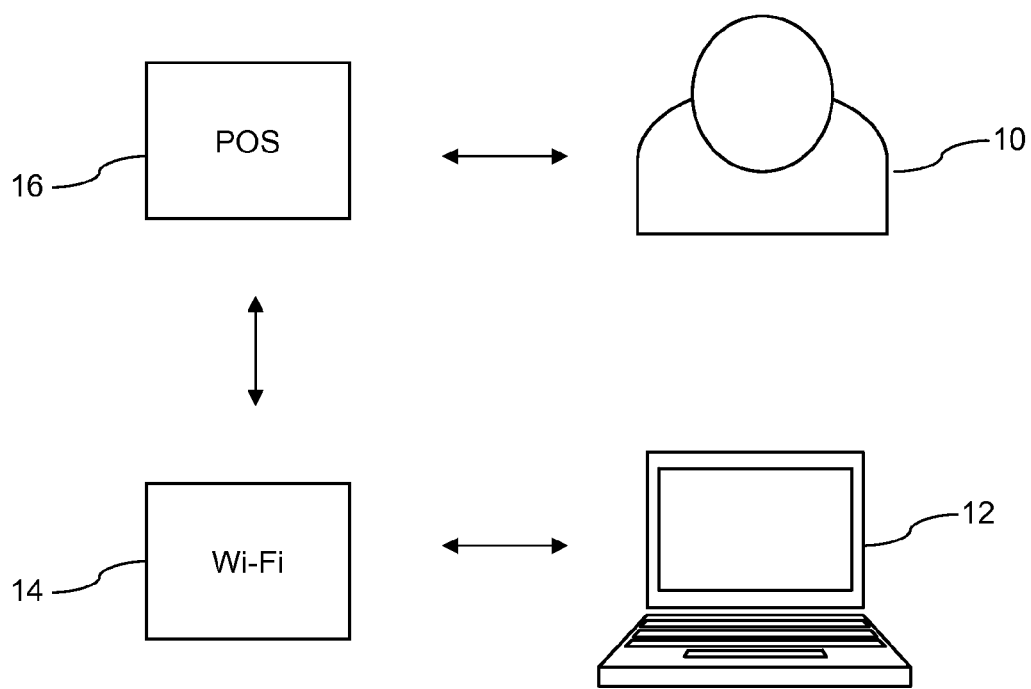
FIGS. 1 and 2 are schematic diagrams of a user in a Wi-Fi network.

FIG. 1 shows a user 10 who has an electronic device 12, here a laptop 12, who wishes to access a computer network 14 through their electronic device 12. The computer network 14 in the Figure is shown as a Wi-Fi network 14, as an example of the type of computer network 14 that the user 10 wishes to access. The computer network 14 is a wireless network that the electronic device 12 can connect to using the appropriate wireless network standard (Wi-Fi). The user 10 interacts with a point-of-sale device (POS) 16, such as a conventional cash register or sales terminal. The set-up shown in FIG. 1 could be an internet café or coffee shop, for example.

The user wishes to access the wireless network 14 with their device 12 and the access is mediated by a component that may form part of the POS device 16, may form part of the computer network 14, may be an entirely separate component or may be distributed between any of these parts. The mediating component, which could be embodied purely in software, will provide the user 10 with authentication that will enable them to access the computer network 14 with their device 12. The mediating component will also define the terms under which the user 10 can access the network 14, for example in relation to quality of service terms such as download limit or length of time.

If the example of FIG. 1 is a coffee shop, then the user 10 will purchase a coffee at the point-of-sale device 16 and the mediating component, which will be connected to the point-of-sale device 16, will provide the processing that facilitates the user 10 access to the computer network 14 and also the quality of service terms. An output is provided that can be used to access the computer network. This output can be provided alongside the traditional receipt that a point-of-sale device 16 will provide after a successful transaction or the output can be part of the receipt. This output is specific to the user 10 and enables them to connect to the computer network 14.

Figure 2:
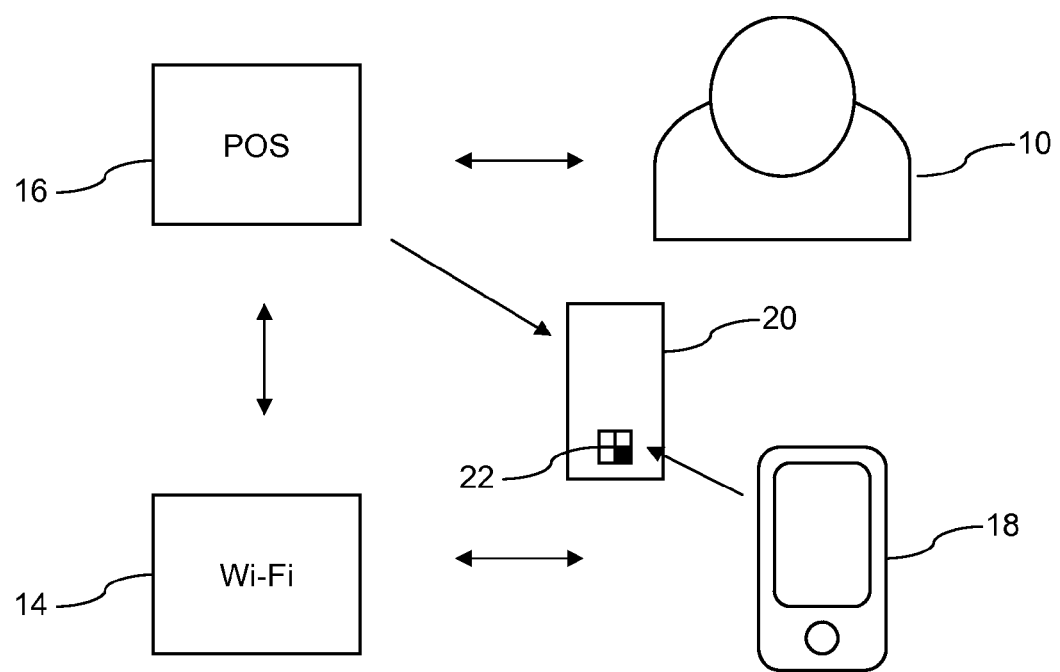

FIG. 2 shows more detail of how the user 10 could access the wireless network 14. In this example, the electronic device 18 that the user possesses that they wish to use to access the wireless network 14 is a smartphone 18. Although such a device 18 will more often than not have wireless wide area coverage, this will normally have a cost implication for the user 10, so it is preferable for the user 10 to access the local wireless network 14 without paying any additional charge. The user purchases an item at the point-of-sale device 16 and is provided with a receipt 20, which includes thereon a code 22.

The code 22 can be scanned by the smartphone 18, as is conventional with modern smartphones. This scanning of the code 22 could be translated into a URL that the smartphone 18 will then access using a browser. The URL could include within it the details of the user 10 and the limitations that comprise the quality of service information that has been generated by the mediation component that is controlling the access of users 10 to the wireless network 14. In this way, the user, by purchasing some goods at the point-of-sale device 16 is provided with access to the wireless network 14, while also having quality of service limitations placed on their access.

The point about the system of FIGS. 1 and 2 is that the mediation of the access is specific to the user 10 and cannot be hijacked by any external individual that has not made a purchase through the point-of-sale device 16. The code 22 is a one-time access code 22 to the wireless network 14, and so even if the receipt 20 is discarded, it cannot be used by any other person with a different electronic device to access the wireless network 14. A further advantage of the system of FIGS. 1 and 2 is that there is no requirement for any intervention by a member of staff and places no additional responsibilities on such staff members.

Figure 3:
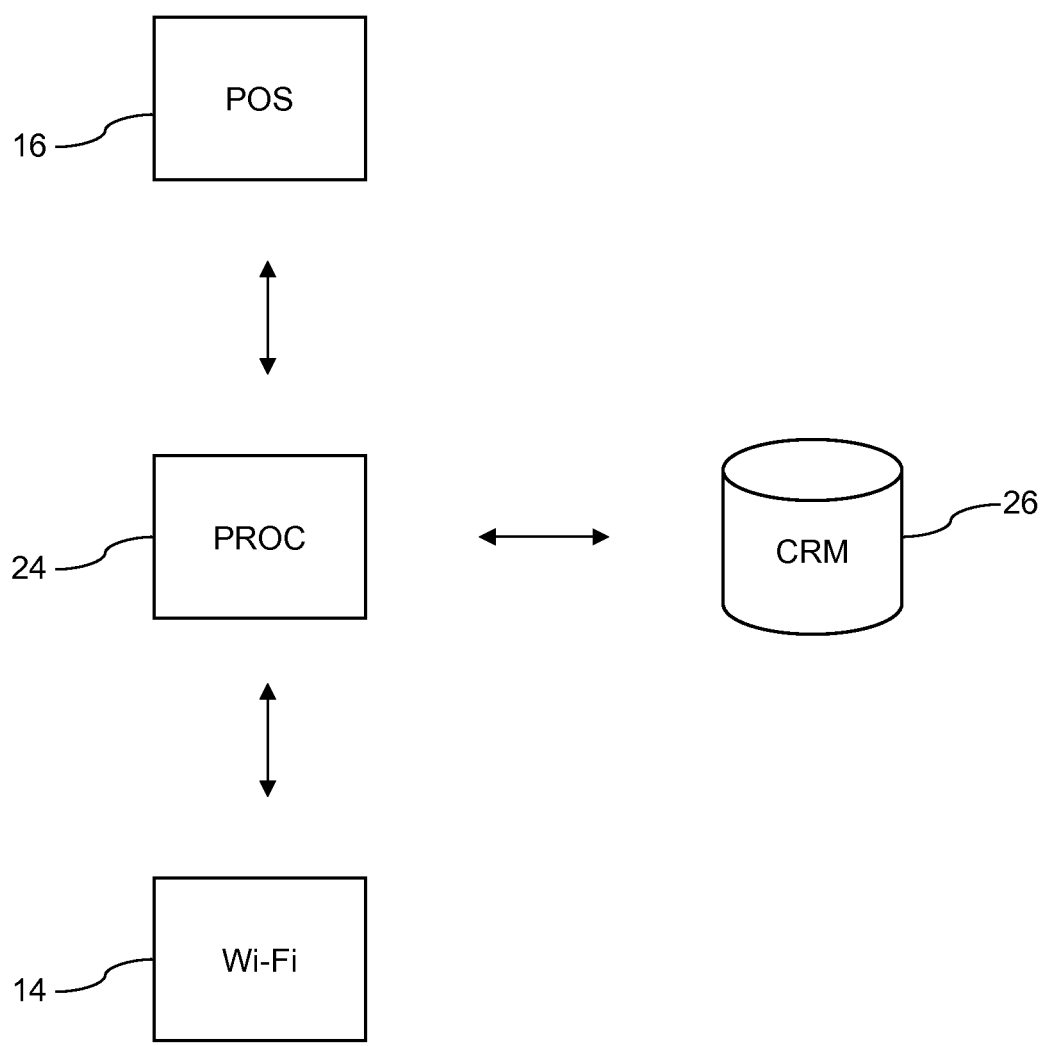
FIG. 3 is a schematic diagram of a system for mediating access to the Wi-Fi network.

FIG. 3 shows how a mediation component 24 will operate. This processor 24 will communicate with both the point-of-sale device 16 and with the wireless network 14. The processor 24 is also connected to a customer database 26. The first task of the processor 24 is to identify the user 10 who wishes to access the computer network 14. The user 10 may present a loyalty card, for example, when they make their purchase at the point-of-sale device 16 and this can be used to locate the user within the customer database 26 and may be used to recall a profile for the user 10 from the customer database 26.

Once the user 10 has been identified, then quality of service data is obtained that is specific to the user 10. This can be implemented in many different ways, but a simple method of implementation would be for all of the customers in the database 26 to be assigned membership of a group. At the simplest level, there will only by two groups, that might be considered as "normal" and "premium" customers, with those spending over a certain amount each month belonging to the "premium" group. Other group structures are obviously possible, there might be an "offer" group who have been previously contacted with a special offer relating to the network access, for example.

The specifics of the quality of service data are again implementation dependent. This quality of service data could include elements such as a limit on the download available to the user 10 or could limit the user's access to a predefined length of time such as 20 minutes. Other quality of service conditions are obviously possible and any combination of such conditions can be used in the quality of service data. The processor 24 then generates a token that comprises the quality of service data and an output (the code 22 in the example of FIG. 2) is provided to the user 10 for their access to the computer network 14.

Figure 4:
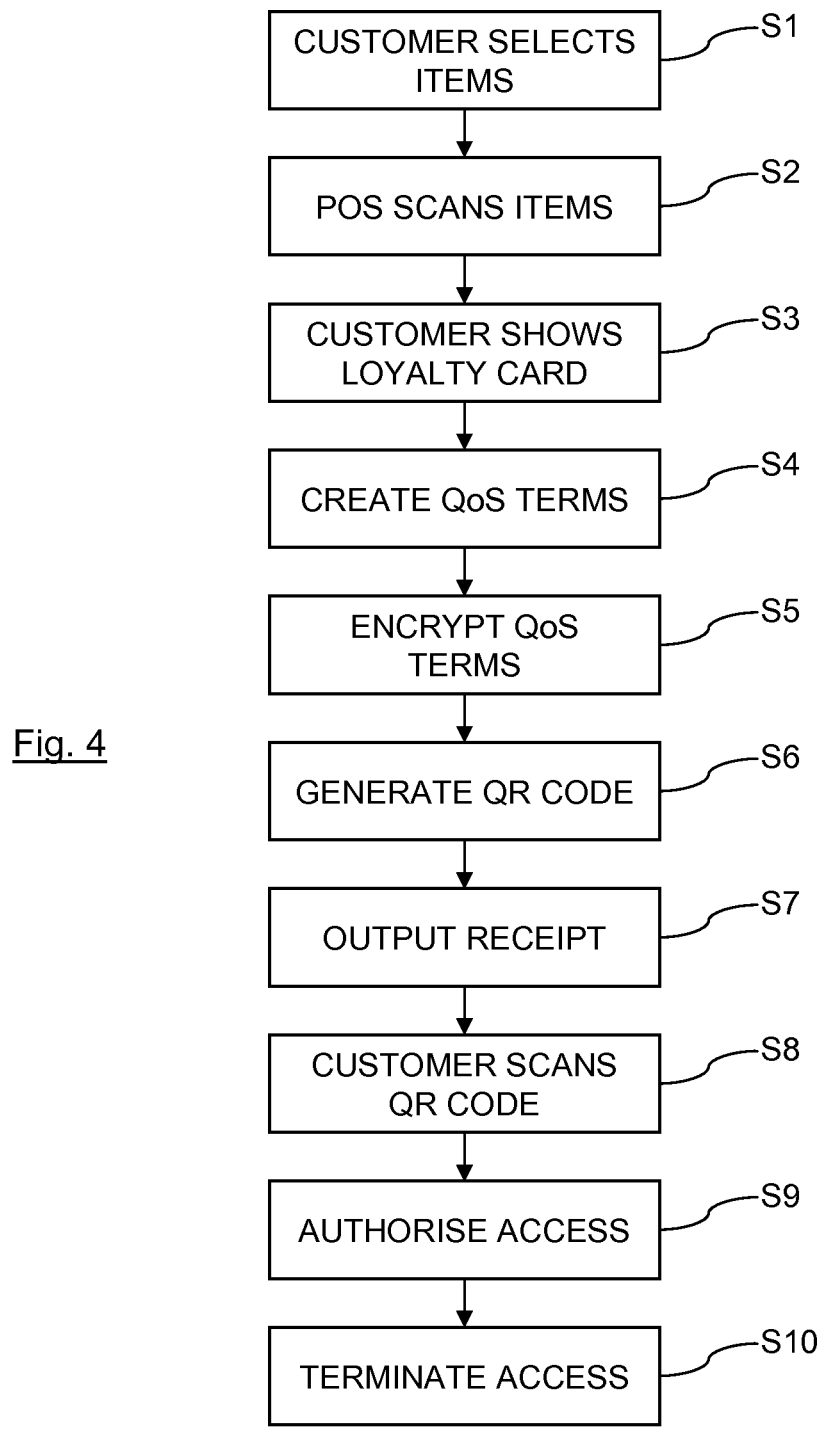
FIG. 4 is a flowchart of a method of mediating access to the Wi-Fi network.

The flowchart of FIG. 4 gives a more detailed example of an implementation of the system. At step S1, the customer 10 selects one or more items for purchase and moves to the point-of-sale device 16 which could be either automated or manual. At step S2, the items are scanned. At step S3, optionally the customer 10 presents a loyalty card for scanning and the CRM database 26 is accessed and a customer profile is retrieved. At step S4, the data from steps 2 and 3 is combined to set the quality of service terms for the Wi-Fi connection, for example a loyal customer gets faster connection, or buying a muffin gets an extra 10 minutes etc.

At step S5, the QOS terms are combined with a time stamp and encrypted with the retailer's private key, in a standard encryption procedure. Step S5 is to stop someone being able to generate their own token. Hiding it with encryption is one way this can be achieved; another is to put it in plain text but provided a digital signature for the token. This signature would prove that it was generated by the system and that the contents had not been altered. At step S6, a QR code 22 is generated which contains a URL for the Wi-Fi gateway with a single query-string parameter which is the encrypted token from step S5. At step S7, the point-of-sale device 16 generates a receipt 20 upon which the QR code 22 is printed (which is why it will be difficult for a passerby to observe and scan the image to gain access). The receipt 20 could also be displayed on a screen of the point-of-sale device 16 for immediate scanning.

At step S8, the customer 10 scans the QR code 22 with the device 18 which is going to be used for Wi-Fi access, for example a smartphone 18 with a suitable camera for performing the scanning. At step S9, when the device 18 accesses the URL in the QR code 22, it will automatically pass through the token to the network 14. The Wi-Fi gateway 14 will then decrypt the token, and after checking the time stamp is within the allowed access window, authorizes the connecting device 18 according to the embedded QOS terms. A step S10, when the QOS of terms expire, then the gateway 14 shuts off the Wi-Fi access. The Wi-Fi gateway 14 will enforce the QOS terms which will include termination of access but also things such as bandwidth throttling.

Figure 5:
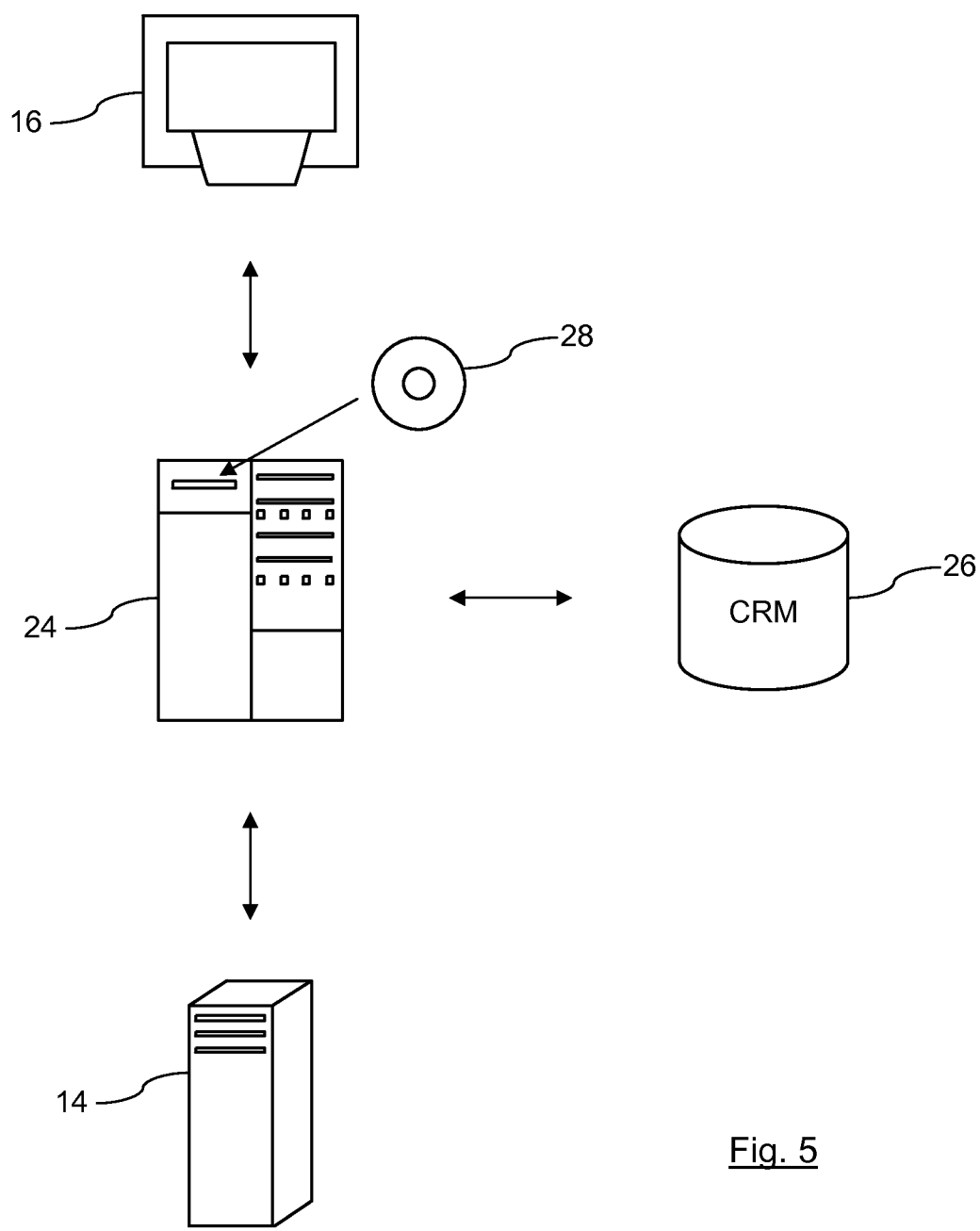
FIG. 5 is a further schematic diagram of the system for mediating access to the Wi-Fi network.

FIG. 5 shows a view similar to FIG. 3 of the preferred embodiment of the system for mediating access to the Wi-Fi network. The point-of-sale device 16 is connected to a dedicated server 24, which connects to the CRM database 26. The server 24 is the component that mediates the access to the Wi-Fi network and is controlled by a computer program product on a computer readable medium 28. The computer program product provides a set of instructions that control the operation of the server 24. The server 24 is also connected to the Wi-Fi gateway 14, which operates the Wi-Fi network in the commercial environment that is employing the improved system.

The server 24 is arranged, when identifying the user 10 who wishes to access the computer network 14, to access the database 26 and retrieve a profile for the user 10. In the preferred arrangement, when obtaining quality of service data specific to the user, the server 24 will identify a group to whom the user 10 belongs and will obtain quality of service data specific to the identified group. The use of groups in this way simplifies the process of generating the required quality of service data, as each group can have the quality of service terms preset so that they do not have to be generated in real-time.

The server 24 generates a token comprising the quality of service data, and provides an output (the receipt 20 with the QR code 22) derived from the token to the user, ideally through the point-of-sale terminal 16. The token preferably comprises a time stamp and the provision of an output derived from the token to the user comprises printing a scanable code 22 on their receipt 20. The system then receives a request from the user for access to the computer network 14 and a check is made that the request received from the user 10 to access the computer network 14 is derived from the output provided to the user 10.

Figure 6:
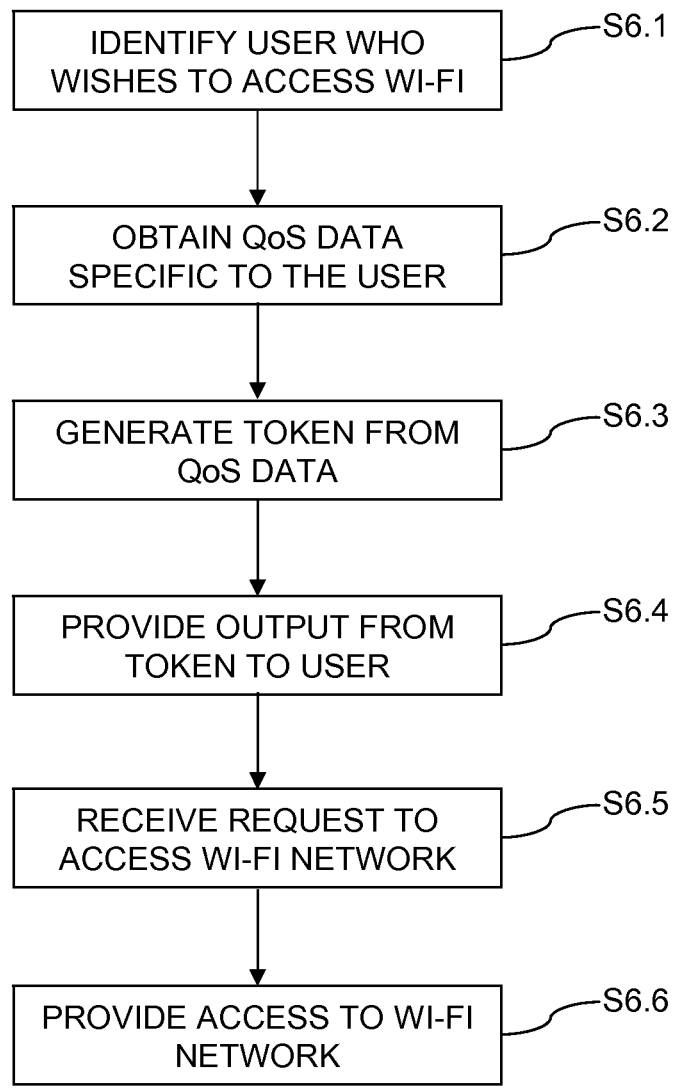
FIG. 6 is flowchart of a method of mediating access to the Wi-Fi network.

The methodology of operating the system is summarized in the flowchart of FIG. 6. This flowchart contains only the minimum steps required to implement the improved system of providing access to the computer network 14. These steps are carried out by the mediation component 24 under the control of the computer program product stored on the CD-ROM 28. Any other steps described above, such as the use of encryption, are optional. When the system is put into use as a practical implementation, then the relevant administrator or installer can decide which additional features are appropriate for the particular implementation. The various enhancements that can be used provide improved systems.

The method of mediating access to the computer network 14 comprises the steps of, step S6.1 identifying a user 10 who wishes to access the computer network 14, step S6.2 obtaining quality of service data specific to the user 10, step S6.3 generating a token comprising the quality of service data, step S6.4 providing an output derived from the token to the user 10, step S6.5 receiving a request from the user 10 for access to the computer network 14, and step S6.6 providing access to the computer network 14 to the user 10 according to the token. In this way mediation of the access to the computer network 10 is provided in a fully automated fashion. The final two steps described here are not essential for a functioning system, as the user request is optional i.e. the preceding points on the CRM linking and the token generation are required, but subsequent access by the user is not necessary, in other words the user may throw the receipt away or the time limit may expire.

Various different advantages are provided by the improved system compared to the existing techniques of either allowing free access to a wireless network or using a single password for access to the wireless network. In the improved system, only approved users will be allowed access and the quality of service will be different for different users depending upon how the service provider wishes to incentivise customers. No additional load is placed on any staff, such as remembering new passwords and dealing with customer queries. An access code that is provided to a user will be a once only use access, which also helps to ensure that the computer network is not accessed by anyone who should not be authorized to do so.

The invention claimed is:

1. A data processing system for mediating access to a computer network, the data processing system comprising a processor device, a memory device and a computer network access device, the data processing system configured to:
   identify, by the data processing system, a user who wishes to access the computer network;
   obtain, by the data processing system, quality of service data specific to the user;
   generate, by the data processing system, a token comprising the quality of service data;
   create, by the data processing system, an output derived from the token for the user;
   receive, by the data processing system, a request from the user for access to a network gateway component of the computer network;
   provide, by the data processing system, access to the computer gateway component to the user according to the token comprising the quality of service data specific to the user who wishes to access the computer network; and
   check, by the data processing system, that the request received from the user to access the computer gateway component is derived from the output provided to the user.

2. The system according to claim 1, wherein the data processing system is configured, when identifying a user who wishes to access the computer network, to access a database and retrieve a profile for the user that specifies the quality of service data specific to the user.

3. The system according to claim 1, wherein the data processing system is configured, when obtaining quality of service data specific to the user, to identify a group to whom the user belongs and obtain quality of service data specific to the identified group, wherein the group comprises a plurality of users.

4. The system according to claim 1, wherein the token further comprises a time stamp.

5. The system according to claim 1, further comprising a component operatively coupled to the processor and arranged to print a scanable code, the code comprising the output derived from the token for the user.

6. The system according to claim 1, further comprising:
   a device operable by the user that is configured to scan the output and generate an associated universal resource locator (URL) that includes an identity of the user who wishes to access the computer network and the quality of service data specific to the user.

7. The system according to claim 6, wherein the device is further configured to access the URL on the computer network and pass through to the computer network the quality of service data specific to the user who wishes to access the computer network.

8. A computer program product comprising program code stored on a non-transitory computer readable storage medium for mediating access to a computer network, the program code comprising instructions for:
   identifying a user who wishes to access the computer network;
   obtaining quality of service data specific to the user;
   generating a token comprising the quality of service data;
   providing an output derived from the token to the user;
   receiving a request from the user for access to a network gateway component of the computer network;
   providing access to the computer gateway component to the user according to the token comprising the quality of service data specific to the user who wishes to access the computer network; and
   checking that the request received from the user to access the computer gateway component is derived from the output provided to the user.

9. The computer program product according to claim 8, wherein the instructions for identifying a user who wishes to access the computer network comprise instructions for accessing a database and retrieving a profile for the user that specifies the quality of service data specific to the user.

10. The computer program product according to claim 8, wherein the instructions for obtaining quality of service data specific to the user comprise instructions for identifying a group to whom the user belongs and obtaining quality of service data specific to the identified group, wherein the group comprises a plurality of users.

11. The computer program product according to claim 8, wherein the token further comprises a time stamp.

12. The computer program product according to claim 8, wherein the instructions for providing an output derived from the token to the user comprise instructions for printing a scanable code.

13. The computer program product according to claim 8, further comprising instructions configured to scan the output and generate an associated universal resource locator (URL) that includes an identity of the user who wishes to access the computer network and the quality of service data specific to the user.

14. The computer program product according to claim 13, further comprising instructions configured to access the URL on the computer network and pass through to the computer network the quality of service data specific to the user who wishes to access the computer network.

* * * * *